No. 880,302. PATENTED FEB. 25, 1908.
C. E. & G. H. HEINEMAN.
PIPE FERRULE.
APPLICATION FILED MAR. 7, 1906.
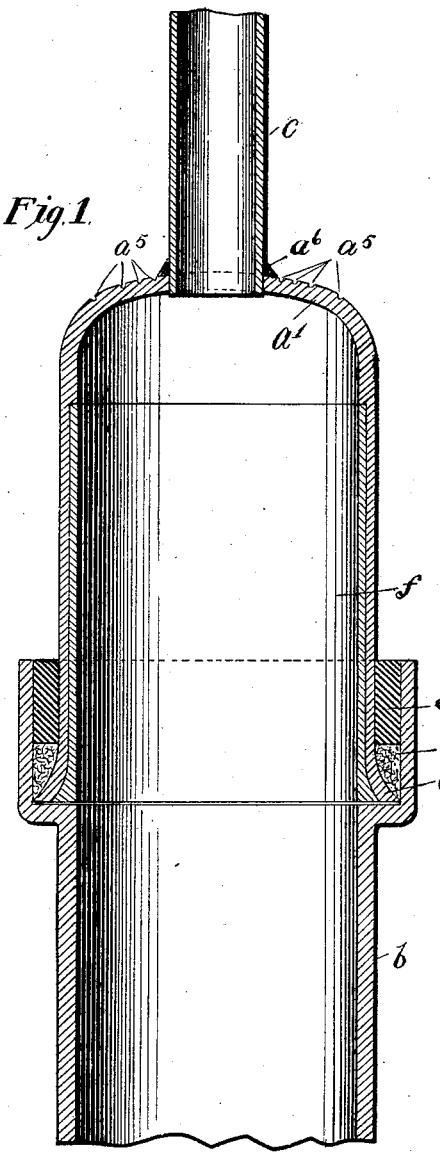
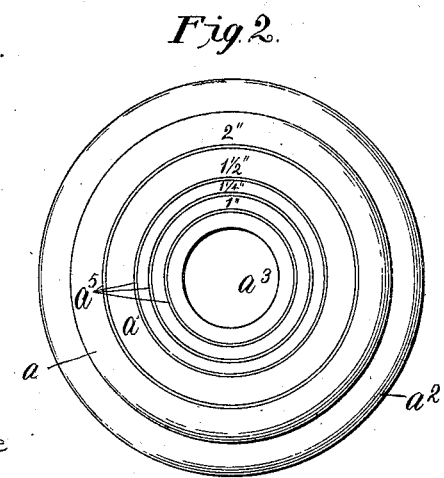
Witnesses:
Chas. F. Bassett
M. A. Milord
Inventors
C. E. Heineman
G. H. Heineman
By Frederick Benjamin
Atty.

UNITED STATES PATENT OFFICE.

CHARLES E. HEINEMAN AND GEORGE H. HEINEMAN, OF ATTICA, INDIANA.

PIPE-FERRULE.

No. 880,302.  Specification of Letters Patent.  Patented Feb. 25, 1908.

Application filed March 7, 1906. Serial No. 304,667.

*To all whom it may concern:*

Be it known that we, CHARLES E. HEINEMAN and GEORGE H. HEINEMAN, citizens of the United States, residing at Attica, in the county of Fountain and State of Indiana, have invented certain new and useful Improvements in Pipe-Ferrules, of which the following is a specification.

This invention relates to couplings for pipes and more especially to that form of couplings or sleeves known as "ferrules" which are made of soft lead or similar material, and are adapted to engage the adjacent ends of two pipes of different cross diameters one of iron and the other of lead, and to have their edges drawn in to fit closely the walls of the lead pipe or section which they embrace.

The work of drawing in or shrinking the end of a ferrule of relatively great cross-diameter so that it will fit nicely a pipe of small cross diameter is considerable, and unless carefully done results in a loose joint at such point.

The object of our invention is to provide a ferrule that can be quickly and easily adapted to pipes of different standard diameters and upon which will be indicated the sizes of the pipes for which it is especially prepared.

In the accompanying drawing which forms a part of this application:—Figure 1 shows in vertical section one of our improved ferrules applied to two pipes of greatly differing cross diameters, and Fig. 2 is a top plan view of the ferrule alone.

Referring to the details of the drawing, $b$ and $c$ respectively represent two sections of pipe of different diameters which it is desired to connect together, and $a$ is the ferrule or coupling element.

The ferrule is made of suitable material of more or less ductility, preferably lead cast over an iron thimble $f$ and is formed in cup-shape with a flange $a^2$ at its larger end which is adapted to engage the shoulder of the pipe $b$ of larger diameter and to be secured to same by packing $d$, and lead $e$ or in any other suitable manner. The opposite or cupped end $a^1$ of the ferrule is slightly convex, and at its center is formed an opening $a^3$. Concentric with the central opening a series of spaced grooves $a^5$ are formed by cutting into the outer face of the end and preferably removing a portion of the metal along the lines of said cuts, thus partially severing the material at these points. These grooves are regularly spaced so that when the metal is entirely cut through along any one of the grooves, a hole will result which will receive with a close fit a pipe of standard diameter, and to indicate this diameter, we impress into the metal adjacent to each groove, figures corresponding to the various diameters of the circles formed by the grooves, as clearly shown in Fig. 2. The joint between a pipe $c$ and the ferrule when cut to fit same will be made gas or water-tight by solder as $a^6$ or in any of the ways known in the plumbers' trade.

Having thus described our invention, we claim:—

1. A pipe ferrule composed of ductile material having one end open with flaring edges, and the other end rounded and partially closed and provided with a central opening of relatively small diameter, and having concentric grooves formed around said opening.

2. A pipe ferrule composed of ductile metal having one end open and having its opposite end partially closed, and provided with a central opening of relatively small diameter, and having concentric grooves formed around said opening by cutting away portions of the ferrule, said grooves being spaced apart and having figures indicating the respective diameters of said grooves.

3. A pipe ferrule formed of ductile metal and provided with a lining of stiff metal, one end of the ferrule being rounded and provided with an opening of relatively small diameter, and having concentric grooves cut in its outer face for the purpose set forth.

In testimony whereof we affix our signatures in presence of two witnesses.

CHARLES E. HEINEMAN.
GEORGE H. HEINEMAN.

Witnesses:
JOSEPH J. LITTLE,
AL. VAIL.